United States Patent

Gassner et al.

[11] Patent Number: 6,048,148
[45] Date of Patent: Apr. 11, 2000

[54] EXPANSION ANCHOR

[75] Inventors: Helmut Gassner, Triesenberg, Liechtenstein; Markus Hartmann, Mauerstetten, Germany; Wolfgang Seyfferth, Feldkirch-Gisingen, Austria; Gerit Knall, Göfia, Austria; Cord-Henrik Surberg, Feldkirch, Austria

[73] Assignee: Hilti Aktiengesellschaft, Schaan, Liechtenstein

[21] Appl. No.: 09/275,516

[22] Filed: Mar. 24, 1999

[30] Foreign Application Priority Data

Apr. 4, 1998 [DE] Germany ............................ 198 15 177

[51] Int. Cl.[7] ...................................................... F16B 13/06
[52] U.S. Cl. ............................ 411/54.1; 411/54; 411/57.1
[58] Field of Search ............................... 411/15, 54, 54.1, 411/57.1, 76, 77, 78

[56] References Cited

U.S. PATENT DOCUMENTS

| 2,227,326 | 12/1940 | Shaw ...................................... 411/54 X |
| 4,073,212 | 2/1978 | Lerich ....................................... 411/54 |
| 5,205,689 | 4/1993 | Fischer .................................. 411/54 X |
| 5,332,346 | 7/1994 | Shinjo ................................... 411/54 X |

FOREIGN PATENT DOCUMENTS 57181 10/1936 Norway .................................... 411/15

*Primary Examiner*—Neill Wilson
*Attorney, Agent, or Firm*—Brown & Wood, LLP

[57] ABSTRACT

An axially extending expansion anchor or dowel has an anchor body (2) with a first end region to be inserted first into a borehole (B) in a receiving material (G) and a trailing second end region in which a load can be applied. The first end region has an axially extending expansion region with at least two expanding tangs (7) separated from one another by axially extending slots. The first end region has a opening (11) into which an expanding body (12) is displaceable axially for radial expansion of the tangs (17). The axially extending opening (11) has an inner axially extending surface (10) closer to the axis of the anchor body and formed by a guide pin (9) of the anchor body (2) and an outer axially extending surface formed by the inner surface of the tangs (7). The expanding body (12) is basically sleeve-like shaped and has an inner surface which bears against the inner surface (10) of the opening (11). The outer surface of the expanding body (12) is, at least in part, wedge shaped. In the radially outwardly expanded state of the tangs (7), the expanding body (11) lies substantially flat against the inner and outer surfaces of the opening (11).

11 Claims, 2 Drawing Sheets

EXPANSION ANCHOR

BACKGROUND OF THE INVENTION:

The present invention is directed to an expansion anchor or dowel formed of an axially extending anchor body with a first end section to be inserted first into a bore hole in a receiving material and an opposite second end section. The second end section contains a load application means. The anchor body has an axially extending expansion region in the first end section formed of at least two axially extending tangs separated from one another by slots. Further, the first end section contains a recess in which an expanding body is received for radially outward expansion of the expansion region when the expanding body is displaced toward the second end region.

In fastening techniques, expansion anchors or dowels are frequently used formed of an anchor sleeve with an expanding region. Axial slots enable the expanding region to be expanded radially outwardly by an expanding body displaced axially in a through hole in the anchor sleeve. The through hole in the expanding region and/or the expanding body have/has a conical shape. The expansion of such known expansion anchors in a through hole takes place usually by a pulsating displacement of the expanding body in the through hole in the expanding region. During displacement, the expanding body can be received completely within the through hole. For such an embodiment of the expansion anchor, additional loss protection for the expanding body is generally required. The expansion takes place due to pulsating driving of the expanding body into the through hole. In the expanded state, the expanding body is held by self-locking the angle of inclination of the conical surfaces is relatively flat. To obtain the required expansion forces, the expanding body must be relatively long and often assumes about half the axial length of the expansion sleeve. As a result, only a relatively short length of the sleeve is available for screwing in a threaded rod and any further adjustment is very limited. As a result of the relatively small depth available for screwing in the threaded rod, there is a problem that the expansion sleeve may break when subjected to a transversely directed load.

In another embodiment, a conically shaped expanding body projects out of the front or leading end of a blind borehole. To expand such an expansion anchor, generally referred to as a "outcone anchor", the anchor sleeve is driven over the expanding body braced against the base the borehole. In the case of "outcone anchors" under load, the expanding body is secured only by friction between the outer surface of the expanding body and the inner surface of the expanding sleeve. The angle of inclination of the conical outer surface of the expanding body must not be larger than the angle of self-locking. To achieve the necessary expansion forces, the expanding body must be made relatively long. As a result of the length of the expanding body, there is the danger that the body will incline and tilt during the setting procedure.

SUMMARY OF THE INVENTION:

Therefore, a primary object of the present invention is to provide an arrangement for avoiding the disadvantages of the expansion anchors known in the prior art. An expansion anchor is provided affording greater assurance that the expanding body, driven into the bore hole, will not be forced out of the borehole. Moreover, any inclining or tilting during the setting process is reliably prevented. For an expansion anchor of the same overall length, the length of the connecting thread can be made greater so that the ability to withstand transverse forces is improved. Moreover, the invention assures that previously limited crack usefulness of known expansion anchors is remedied.

In accordance with the present invention, the expansion anchor or dowel has an anchor body provided with load application means and an expansion region at its leading end section located opposite to the load application means. The expansion region has two expanding tangs separated from one another by axially extending slots. The expansion region contains a recess open at the leading end of the anchor body in which an expanding body is held and can be displaced axially for radially outwardly expanding the expansion region. The recess is formed by an axially extending opening with an inner surface closer to the anchor body axis formed by a guide pin and an outer surface formed by the inner surface of the expanding tangs. The expanding body is formed in a sleeve-like fashion having an inner surface in contact with the inner surface of the opening closer to the anchor body axis. The outer surface of the expanding body is formed at least in part by a wedge surface. In the radially expanded condition of the expanding tangs, the sleeve-like expanding body lies basically flat against the inner and outer surfaces of the opening.

Unlike known expansion anchors, the sleeve-like expanding body of the expansion anchor embodying the present invention is secured doubly by friction in the expanded condition or state. Accordingly, the inner surface of the expanding body interacts with a guide pin formed as a part of the anchor body and the outer surface of the expanding body bears in a planar fashion against the inner surface of the expanding tangs. As a result, a frictional force approximately twice that acting on known expansion anchors, counteracts the expulsion force acting on the expanding body that has been driven into the anchor body. Accordingly, when the angle of inclination of the outer surface of the expanding body, formed as a wedge surface, is of a equal magnitude, assurance against expulsion is clearly increased. On the other hand, based on the invention, the possibility exists of increasing the angle of inclination of the wedge surface by up to 100%, while keeping the assurance against expulsion the same.

The possibility of increasing the angle of inclination of the wedge surface of the expanding body without affecting its security within the opening, makes it possible, by a modification of the expanding tangs, to produce back-chiseling in the bore hole during the setting process. Accordingly, the expanding tangs can be provided at their free leading ends with cutting edges projecting from the outer surface. The effective cutting angle of the cutting edges is about five degrees to ten degrees. To improve the conformity of the chiselling curve and the tractrix, the expanding tangs have largely toroidal surfaces. The radius of curvature of the toroidal outer surface amounts to about 300% to 450% of the nominal connecting diameter of the expansion body. Due to the positive back-chiseling, the expansion anchor of the present invention withstands higher load values both in solid as well as cracked receiving material. Borehole tolerances no longer determine the load carrying capacity. As a result of the positive locking in the borehole surface produced by chiselling, the expansion forces caused during stressing, are relatively slight. As a result, the expansion anchor of the present invention also permits smaller edge and axial distances.

The larger angle of inclination of the outer surface permits a shorter construction of the expanding body. As a result, a greater length is available for a connecting thread and this affords more possibilities for adjusting a threaded rod screwed into the connecting thread. As a result of the greater screwed in length, the ability of the expansion anchor of the present invention to withstand transverse loads is increased and the danger of breaking the expansion sleeve is decreased. Due to the two-dimensional contact between the sleeve-shaped expanding body and the inner and outer surfaces of the opening, the stiffness of the expansion anchor is increased. Local deformation resulting from linear contact can be avoided. In its initial state, the expanding body is held in the opening by means of its inner and outer surfaces. During the pulsating driving of the expanding body, it is guided along both surfaces. As a result, tilting and inclining of the expanding body is effectively avoided. The guide pin is a component of the anchor body. Its function is to facilitate the introduction of the sleeve-shaped expanding body into the opening. Under tension, the guide pin also assumes a portion of the tension load. For this purpose, it proves to be advantageous if the stressed cross-section of the guide pin is at least 25% of the sum of the stressed cross-sections of the expanding tangs.

In a preferred arrangement, the guide pin has an axial length equal to or greater than the axial length of the opening formed by the recess. If the guide pin is longer, the guidance of the expanding body is especially good. Preferably, the length of the guide pin corresponds to the length of the expanding body. When the expanding tangs are expanded completely, the guide pin of the anchor body bears against the receiving material. The user recognizes this by the different sound and by the rebound of the hammer as it strikes the expansion sleeve. In this way, the user becomes aware of the end of the setting procedure and of the successful expansion of the expansion anchor.

In one embodiment of the present invention, the opening is formed of at least two slots extending axially from the leading end of the anchor body with strip like openings in the circumferential periphery of the anchor body. At the same time, the slots define the expanding tangs which are set radially outwardly. Further, the part of the anchor body located between the slots forms the guide pin.

To create the largest possible frictional surfaces for securing the expanding body, it is advantageous if the opening for the expanding body has a closed contour in plan view. In such an arrangement, the contour or shape of the opening can be circular or polygonal.

For reasons of symmetry and in view of obtainable stressed cross sections of the expanding tangs, the opening formed by the recess, in plan view preferably has the shape of an equilateral triangle. Such shape is formed by three slots extending axially from the leading end of the anchor body and ending in strip-like openings at the circumferential periphery of the anchor body. Preferably, the load application means is an internal or external thread of a threaded rod provided in the trailing end section of the anchor body. To prevent the expanding tangs from breaking under load, care must be taken when arranging the slots forming the opening that the minimum stressed cross-section of the expanding tangs is at least as great as the stressed cross-section in the region of the connecting thread.

This requirement results in a value of the axial depth of the opening formed by the slots of 60% to 85% of the nominal diameter of the connecting thread.

Particularly, since positive locking is produced by the chiselling action of the radially set expanding tangs, it is advantageous if the wedge surface of the expanding body, driven into the opening formed by the recess, encloses an angle of about five degrees to about twenty-five degrees with the axis. In this way, hardly any expansion forces, directed perpendicularly to the borehole wall, must be applied during the setting procedure. Instead, the hammer blows are converted into chiselling forces directed at an angle to the borehole wall. As a result, the expansion anchor can be secured in the receiving material with considerably less effort.

To assure, as far as possible, that the sleeve-shaped expanding body bears flat against the base of the borehole during the setting procedure, it is advantageous if the leading surface adjoining the section of the expanding body with the largest diameter, is swept back from the inner surface to the outer surface and forms an angle of about forty degrees to sixty degrees with the axis of the expanding body.

In a preferred arrangement, the opening arranged to receive the expanding body is connected through a passage with a borehole in the trailing or second end section of the anchor body where the internal thread is located. In such an arrangement, the expanding body has a bracket-like axial extension that projects from the opening into the borehole when the expanding body is pushed completely into the opening of the recess. This embodiment of the present invention makes it possible to check the correct setting procedure with simple means. For this purpose, a test pin equipped at its leading end with a projecting bracket is introduced into the borehole of the expansion sleeve and rotated. The expansion anchor is correctly set if the bracket-like extension on the expanding body protrudes into the bore hole and, when engaging the bracket at the front end of the test pin, prevents further rotation.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

Figure 1:
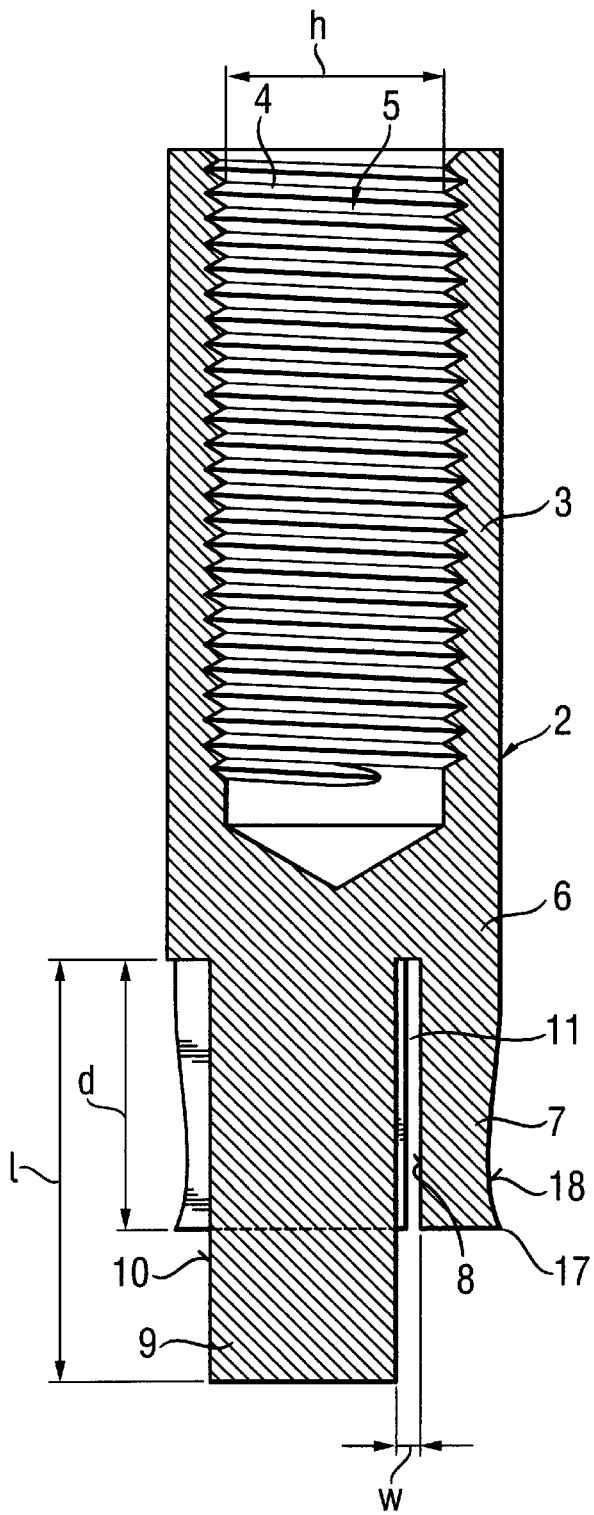
FIG. 1 is an axially extending sectional view of an anchor body f an expansion anchor embodying the present invention.
Figure 2:
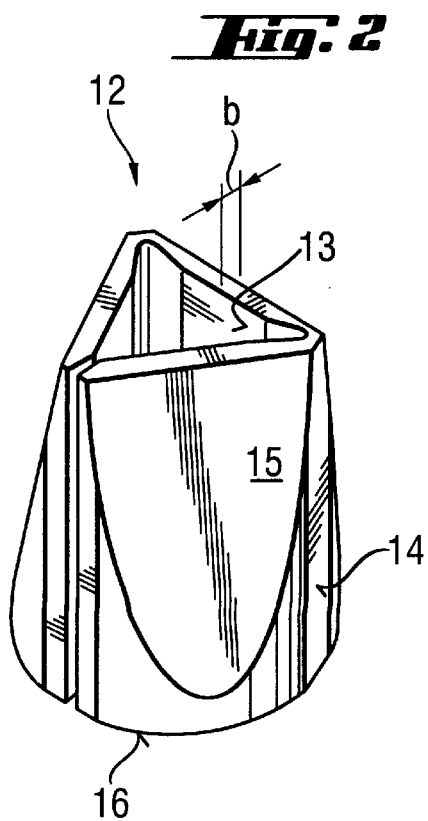
FIG. 2 is a perspective view of the expanding body of the expansion anchor shown in FIG. 1.

DETAILED DESCRIPTION OF THE INVENTION:

FIGS. 1 and 2 display a first embodiment of the expansion anchor or dowel of the present invention. The expansion anchor comprises an axially extending anchor body 2 with an axially extending first end section, the lower section as viewed in FIG. 1 and a second or trailing end section 3, the upper section, containing an axially extending borehole 5 with an internal thread 4. The first end section has an axially extending expansion region 6 having expanding tangs 7 at its outer circumferential periphery separated from one another by axially extending slots. Expansion region 6 has an axially extending opening 11 extending from the leading end of the anchor body towards the trailing second end section 3. The opening 11 forms an axially extending recess. The opening 11 is bounded by the inner surfaces 8 of the expansion tangs 7 and by the outer surface 10 of a guide pin 9, forming a part of the anchor body 2. The opening 11 serves to receive an expanding body 12 having a sleeve-like form with a radially inner surface 13 and an outer surface 14, note FIG. 2. At least an axially extending partial region of the outer surface 14 of the expanding body 12 is constructed as a wedge surface 15. The transverse section of the axially extending expanding body 12 corresponds to the cross-section of the opening 11 in the expansion region 6 of the anchor body 2.

The opening 11 has an axial dimension or depth d, note FIG. 1, corresponding approximately to 60% to about 85% of the nominal diameter h of the internal thread 4 in the second end section 3 of the anchor body 2. The initial width of the opening 11 corresponds to the minimum wall thickness b of the expanding body 12 and, preferably, is in a range of about 5% to about 20% of the nominal thread diameter h of the internal thread 4. For example, the guide pin 9 has a length greater than the depth of the opening 11. Preferably, the length corresponds to the length of the expanding body 12. The guide pin 9 has a stressed cross-section corresponding to at least 25% of the sum of the stressed cross sections of the expanding tangs 7.

At the leading ends, the expanding tangs 7 are formed with cutting edges 17 which work the bore hole surface in a chiselling manner during the axially directed pulsating setting procedure and provide a positive locking in the region of the base of the borehole. The effective cutting angle of the cutting edges 17 is preferably in the range of 5° to about 10°. The outer surface 18 of the expanding tangs 7, facing the surface of the borehole, is shaped toroidally so that the chiselling curve largely coincides with the tractrix of the expanding tangs 7 and the tangs 7 achieve as flat or planar contact as possible in the back chiselling operation. For manufacturing reasons, the toroidal outer surface 18 of the expanding tangs can also approximate a cylindrical or conical surface. The radius of curvature of a toroidal surface, coming closest to the actual course of the outer surface 18 of the expanding tangs, is about 300% to about 450% of the nominal diameter h of the internal thread 4.

Figure 3:
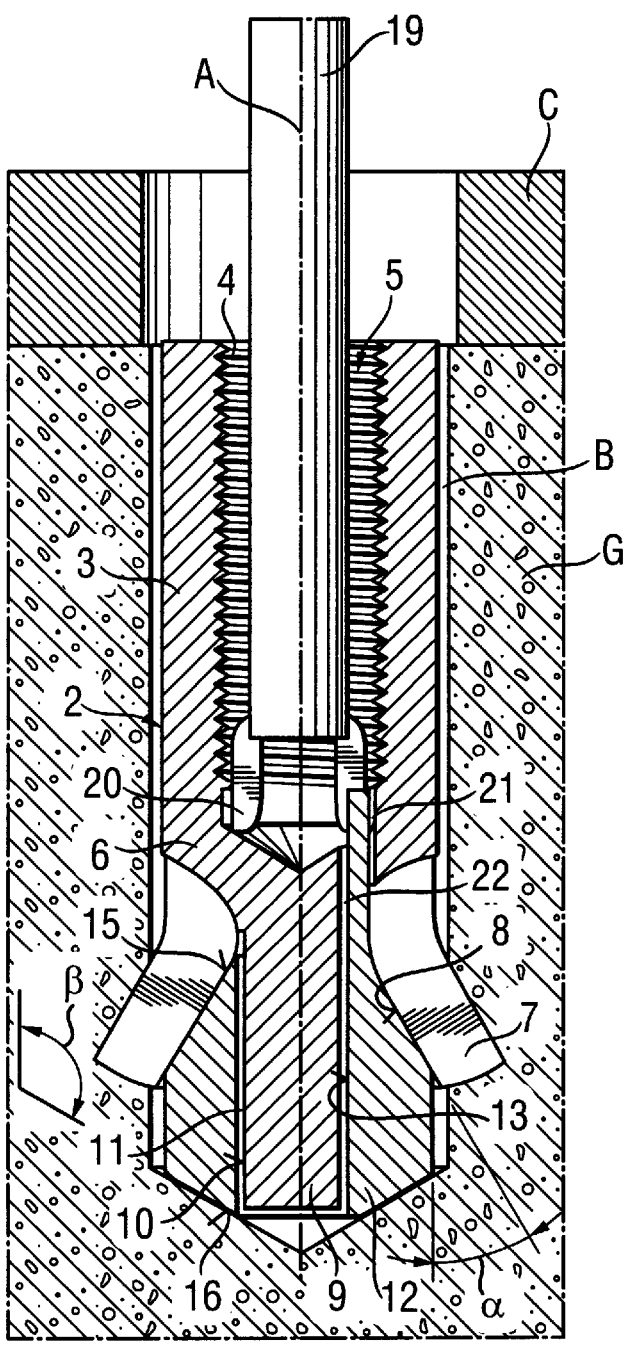
FIG. 3 is an axially extending sectional view of another embodiment of the expansion anchor displayed in the expanded condition.

FIG. 3 displays a second embodiment of the expansion anchor secured positively in a borehole B in a receiving material G. A member C is to be secured to the surface of the receiving material G by means of a load application means, not shown, secured in the internal thread 4 of the anchor body 2. Parts identical with those illustrated in FIGS. 1 and 2 have the same reference numerals. As shown, the expanding body 12 is driven completely into the opening 11. The inner surface 13 of the expanding body 12 and the outer surface 10 of the guide pin 9 as well as the wedge surfaces 15 at the outer surface 14 of the expanding body 12 and the inner surfaces 8 of the expanding tang 7 interact frictionally and prevent the expulsion of the expanding body 12 which has been driven into the opening 11. The magnitude of the angle of inclination a enclosed by the wedge surfaces 15 and the axis A of the anchor body 2 and the expanding body 12 is in the range of 5° to about 25°. To achieve, as far as possible, a two dimensional contact of the expanding body 12 at the base of the borehole B, the expanding body 12 has a leading surface 16 which is swept back from the inner surface 13 to the outer surface 14 and with the axis A encloses an angle β in the range of 40° to 60°.

The expansion anchor, illustrated in FIG. 3, differs form the embodiment in FIGS. 1 and 2, particularly due to a bracket-like extension 21 which projects axially from the trailing end of the expanding body 12, that is, at the opposite end from the leading surface 16. When an expanding body 12 has been driven completely into the opening 11, the bracket-like extension 21 projects through a passage 22 into the axially extending bore hole 5 in the second end section 3 of the anchor body 2. In this modification, the correct expansion of the expansion anchor can be checked subsequently in a very simple manner. For this purpose, a test pin 19, equipped at its leading end with at least one bracket 20 extending axially towards the first end region, that is, in a downward direction as viewed in FIG. 3, is introduced into the borehole 5 and rotated. The expansion anchor is properly set if the bracket-like extension on the expanding body projects into the borehole 5 and, on striking the bracket 20, prevents rotation at the leading end of the test pin 19.

Figure 4:
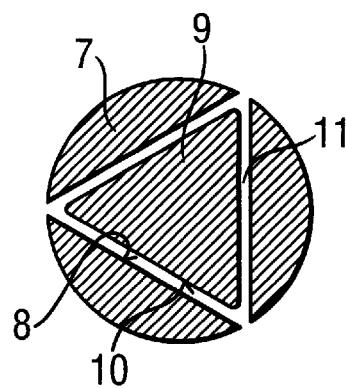
FIGS. 4–6 are cross-sectional views of different embodiments of the expansion region of the anchor body.
Figure 5:
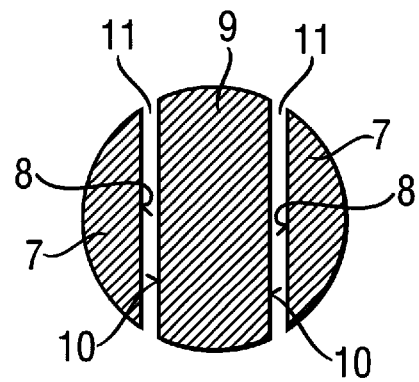
Figure 6:
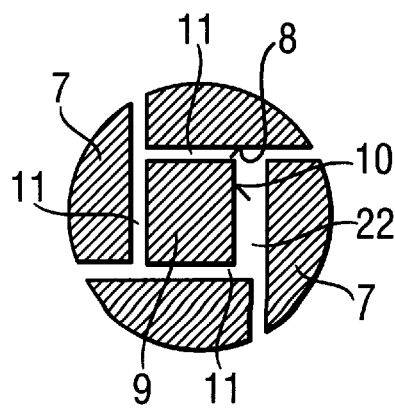

Different arrangements of the cross-sectional shape of the opening 11 are shown in FIGS. 4–6. The cross-sectional shape in FIG. 4 corresponds to the arrangement of the opening 11 in the anchor body, shown in FIG. 1 for receiving a triangularly shaped expanding body as in FIG. 2. The chord-like axially extending slots form an opening 11 with a closed contour in the shape of an equilateral triangular. The axial slots in the first end section of the anchor body 2 define the inner surface of the three expanding tangs 7 and are separated from other another by the width of the opening 11. The guide pin 9 has a triangular cross-section. The opening 11 is bounded radially outwardly by the inner surface 8 of the expanding tangs 7 and radially inwardly by the outer surface 10 of the guide pin 9. FIG. 5 displays another embodiment of the expansion anchor with the opening 11 formed of two parallel chordally extending slots which form the inner surface of the expanding tangs 7. The guide pin 9 between the parallel slots has a basically rectangular cross-section with two opposite curved end surfaces. The sleeve-shaped expanding body, not shown, to be used with the openings 11 in FIG. 5, has a cross-section corresponding essentially to the shape of cross-section of the guide pin 9. FIG. 6 shows another embodiment of the opening 11 for receiving a sleeve-shaped expanding body. The opening 11 has a quadrilateral shape, preferably a square shape. Moreover, the shape of the opening 11 corresponds to that illustrated for the expansion anchor in FIG. 3. The associated expanding body has a square cross-section. The expanding tangs 7 formed by the four axially extending slots 11 enclose a guide pin 9 of square cross section.

The opening 11 may also have other cross-sectional shapes, either closed or open. For example, the opening can be formed as an annular opening. Axial slots extending from the outer circumference of the anchor body to the annular opening would separate the expanding tangs from one another. In the case of an annular opening, the guide pin would have a circular cross-section. The sleeve-like expanding body also would have a largely circular cross-section. The wedge surfaces of the expanding body can be formed as conical surfaces.

The anchor body of the expansion anchor of the present invention usually is formed of steel and is transformed by metal-cutting procedure processes or cold forming. The axial slots, which form the receiving opening for the expanding body and separate the expanding tangs from one another, are formed by sawing or in a cold molding process for example, by extrusion.

The sleeve-shaped expanding body can also be produced by a metal cutting or a cold molding procedure. In an advantageous embodiment of the invention, the anchor body is shaped from a bent sheet metal stamping. The expanding body, produced by rolling or molding, need not be completely closed. It is sufficient if the wall parts provided with the wedge surfaces are connected to one another as one piece.

While specific embodiments of the invention have been shown and described in detail to illustrate the inventive principles, it will be understood that the invention may be embodied otherwise without departing from such principles.

We claim:

1. An expansion anchor comprising an axially extending anchor body (2) having an axis, an axially extending first end section to be inserted into a bore hole (B) in a receiving material (G) and an opposite axially extending second end section (3) and a circumferential periphery, a load application means (4) is located in said second end section in said anchor body, said anchor body has an axially extending expansion region (6) in said first end section, said expansion region (6) has at least two axially extending tangs (7) separated from one another, said anchor body (2) has an axially extending recess in said first end section, an axially extending expanding body (12) is arranged to be inserted into and be axially displaced in said recess toward said second end section (3), said recess comprises at least one axially extending opening (11) with at least two sections each corresponding to one said tang having an inner surface closer to the axis of said anchor body and an outer surface more remote from the axis of said anchor body than said inner surface, said inner surface being formed by an outer surface (10) of an axially extending guide pin (9) in said first end region of said anchor body and said outer surface of said opening being formed by an inner surface (8) of said tangs (7) facing inwardly toward the axis of said anchor body, said expanding body (12) has an axially extending sleeve-like form with a inwardly facing surface (13) and an outwardly facing surface (14), said inwardly facing surface (13) extends along and contacts said outer surface (10) of said guide pin (9), said outwardly facing surface (14) of said expanding body (12) has wedge-shaped surfaces (15) extending in the axial direction, said expanding body arranged to expand said tangs (17) radially outwardly into an expanded state and, in the expanded state, said expanding body having said inwardly facing surface (13) in bearing contact with said inner surface of said opening (11) and said outwardly facing surface (14) being in bearing contact with said outer surface of said opening (11).

2. An expansion anchor, as set forth in claim 1, wherein said guide pin (9) in the expanded condition has a stressed cross-section comprising at least 25% of a sum of a stressed cross-sections of said expanding tangs (7) in the expanded condition.

3. An expansion anchor, as set forth in claim 1 or 2, wherein said load application means (4) is an one of an internal thread and an external thread of a threaded rod arranged to extend into a bore hole (5) in the second end section (3) of said expanding body (2), and said load application means (4) includes a connecting thread in said second end section (3) and said opening (11) having an axial dimension (d) in the range of 60% to 85% of a nominal diameter (n) of said connecting thread.

4. An expansion anchor, as set forth in claim 3, wherein said guide pin (9) has an axial length (l) at least equal to the axial depth (d) of said opening (11).

5. An expansion anchor, as set forth in claim 4, wherein the axial length (l) of said guide pin (9) corresponds to an axial length of said expanding body (11).

6. An expansion anchor, set forth in claim 1 or 2, wherein said opening (11) comprises at least two slots extending axially from a leading end of said anchor body (2) in said first end region and transversely of the axial direction end in axially extending strip-like slots in the circumferential periphery of said anchor body (2).

7. An expansion anchor, as set forth in claim 6, wherein said opening 11 has an equilateral triangle configuration in a plane extending transversely of the axial direction of said anchor body and is formed by three slots extending axially from a leading end of said anchor body (2) and has axially extending strip like opening in the circumferential periphery of said anchor body (2).

8. An expansion anchor, as set forth in claim 1 or 2, wherein said opening (11) for said expanding body (12) has a closed configuration in a plane extending transversely of the axial direction of said anchor body.

9. An expansion anchor, as set forth in claim 1 or 2, wherein said wedge surface (15) of said expanding body (12) encloses an angle ($\alpha$) with the axis (A) of said anchor body (2) in the range of 5° to about 25°.

10. An expansion anchor, as set forth in claim 1 or 2, wherein said expanding body (12) has a leading end surface facing into said bore hole (B) of said receiving material (G) and said leading end surface is swept back from the inner surface (13) to the outer surface (14) of said expanding body and forms with the axis (A) of said anchor body (2) an angle (B) in the range of approximately 40° to 60°.

11. An expansion anchor, set forth in claim 1 or 2, wherein said anchor body (2) has an axially extending hole (5) in said second end section (3), said opening 11 has a passage (22) connected with said borehole (5), and said expanding body has a bracket-like axial extension (21) at a trailing end thereof facing said second end region whereby when said expanding body (12) is completely driven into said opening (11) said extension (21) projects through said passage (22) into said borehole (5).

* * * * *